: US 10,823,098 B1

United States Patent
Bayer et al.

(10) Patent No.: US 10,823,098 B1
(45) Date of Patent: Nov. 3, 2020

(54) LOW SPEED PRE-IGNITION KNOCK DETECTION, MITIGATION, AND DRIVER NOTIFICATION

(71) Applicants: Ethan E Bayer, Lake Orion, MI (US); Jonathan D Stoffer, Rochester Hills, MI (US); David A Lawrence, Lake Orion, MI (US); William P Attard, Brighton, MI (US); Tyler Tutton, Royal Oak, MI (US)

(72) Inventors: Ethan E Bayer, Lake Orion, MI (US); Jonathan D Stoffer, Rochester Hills, MI (US); David A Lawrence, Lake Orion, MI (US); William P Attard, Brighton, MI (US); Tyler Tutton, Royal Oak, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/387,677

(22) Filed: Apr. 18, 2019

(51) Int. Cl.
| | | |
|---|---|---|
| *F02D 41/22* | (2006.01) | |
| *F02D 41/14* | (2006.01) | |
| *F02D 41/00* | (2006.01) | |
| *G07C 5/08* | (2006.01) | |
| *B60W 50/14* | (2020.01) | |

(52) U.S. Cl.
CPC ......... *F02D 41/22* (2013.01); *F02D 41/0007* (2013.01); *F02D 41/1498* (2013.01); *G07C 5/0816* (2013.01); *B60W 50/14* (2013.01); *F02D 2041/228* (2013.01); *F02D 2200/025* (2013.01); *F02D 2250/26* (2013.01)

(58) Field of Classification Search
CPC .. F02D 41/22; F02D 41/0007; F02D 41/1498; F02D 2041/228; F02D 35/02; F02D 35/027; F02D 2200/025; F02D 2250/26; B60W 50/14; F02P 5/152
See application file for complete search history.

(56) References Cited

U.S. PATENT DOCUMENTS

| | | |
|---|---|---|
| 5,594,649 A | 1/1997 | Cook et al. |
| 5,905,193 A | 5/1999 | Hashizume et al. |
| 6,118,276 A | 9/2000 | Nakata et al. |
| 6,615,811 B1 | 9/2003 | Butler, Jr. |

(Continued)

FOREIGN PATENT DOCUMENTS

| | | |
|---|---|---|
| WO | 2014064099 A3 | 6/2014 |

OTHER PUBLICATIONS

Attard, William, P. et al., "Abnormal Combustion including Mega Knock in a 60% Downsized Highly Turbocharged PFI Engine", SAE International, p. 1-17 (May 5, 2010).

*Primary Examiner* — Jesse S Bogue
*Assistant Examiner* — Loren C Edwards
(74) *Attorney, Agent, or Firm* — Ralph E Smith

(57) ABSTRACT

A low speed pre-ignition detection, mitigation, and driver notification system and method utilize a controller to analyze a knock signal from a knock sensor to detect LSPI knock of the engine and in response to detecting the LSPI knock, enrich a fuel/air ratio of the engine and limit a torque output of the engine to a level that is less than a maximum torque output of the engine, and when enriching the fuel/air ratio of the engine and limiting the torque output of the engine does not mitigate the LSPI knock, output at least one message for a driver of the vehicle instructing the driver to take remedial action to mitigate the LSPI knock.

12 Claims, 4 Drawing Sheets

(56) References Cited

U.S. PATENT DOCUMENTS

| | | |
|---|---|---|
| 6,883,497 B2 | 4/2005 | Wozniak et al. |
| 7,533,651 B2 | 5/2009 | Surnilla |
| 8,245,692 B2 | 8/2012 | Glugla et al. |
| 8,438,906 B2 | 5/2013 | Heinzelmann |
| 8,720,416 B2 | 5/2014 | Amann et al. |
| 8,731,799 B2 | 5/2014 | Makino et al. |
| 8,973,429 B2 | 3/2015 | Gwidt |
| 9,080,521 B2 | 7/2015 | Amann et al. |
| 9,903,334 B2 | 2/2018 | Attard et al. |
| 2012/0186225 A1 | 7/2012 | Amann et al. |
| 2013/0139786 A1* | 6/2013 | Glugla ............... F02D 41/0087 123/321 |
| 2015/0322369 A1 | 11/2015 | Patel et al. |
| 2016/0208723 A1 | 7/2016 | Haenel et al. |
| 2017/0051688 A1 | 2/2017 | Glugla et al. |
| 2017/0328333 A1 | 11/2017 | Attard et al. |
| 2018/0298871 A1 | 10/2018 | Inoue et al. |

\* cited by examiner

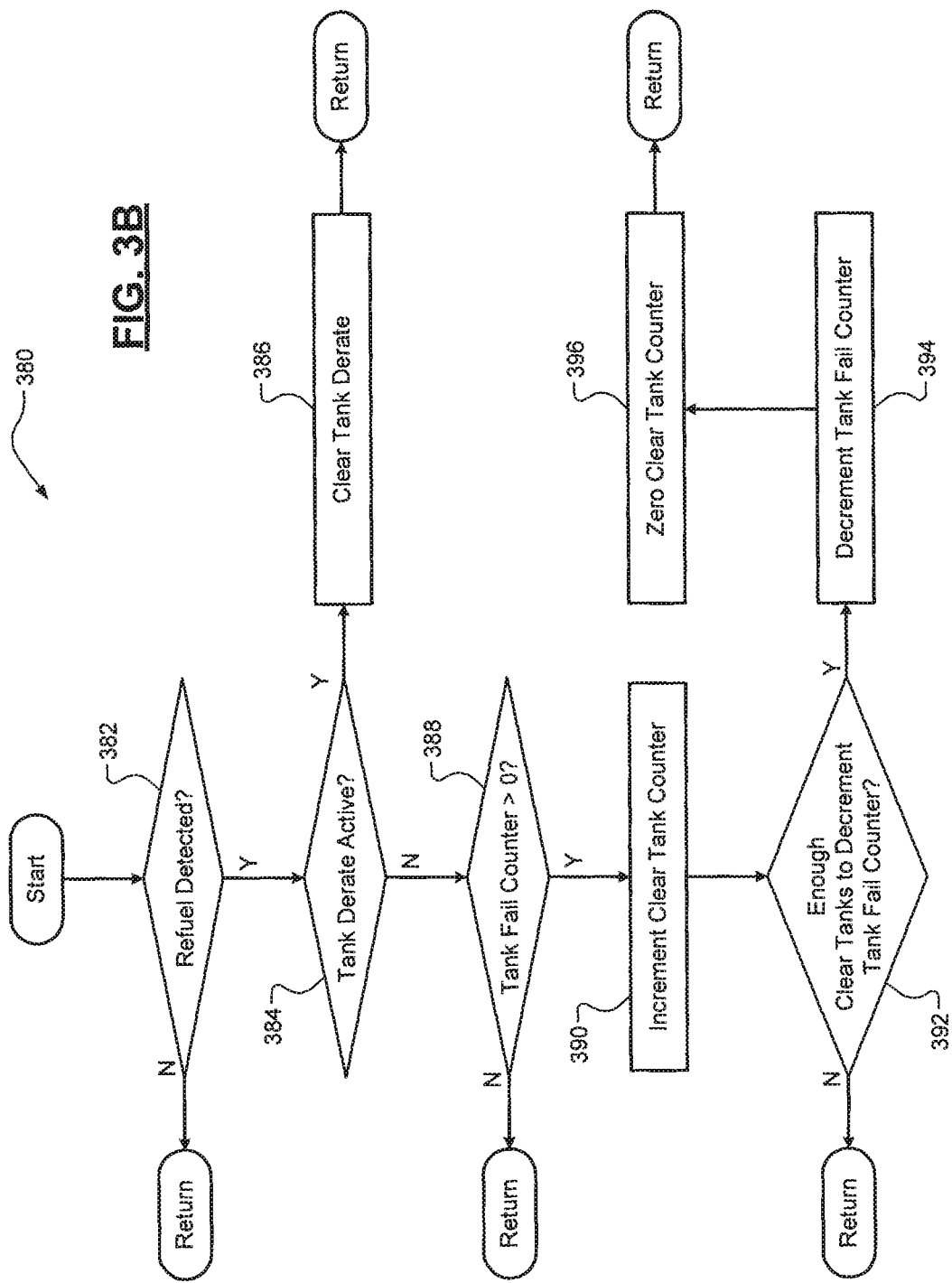

US 10,823,098 B1

LOW SPEED PRE-IGNITION KNOCK DETECTION, MITIGATION, AND DRIVER NOTIFICATION

FIELD

The present application generally relates to engine knock detection and, more particularly, to techniques for low speed pre-ignition (LSPI) knock detection, mitigation, and driver notification.

BACKGROUND

Internal combustion engines combust a fuel/air mixture within cylinders to drive pistons that rotatably turn a crankshaft to generate drive torque. Abnormal combustion of the fuel/air mixture can cause vibration of the engine (e.g., seismic waves through the engine structure), which is also known as "knock." There are two primary types of engine knock: (1) end-gas auto-ignition (also known as "spark knock") and (2) low speed pre-ignition (LSPI) knock (also known as "mega knock"). LSPI knock is a stochastic, abnormal start of combustion prior to spark discharge. Possible causes of LSPI knock include cylinder hot spots or oil ingestion, or chemical pre-reactions, each creating pressure waves that collide causing the LSPI knock.

LSPI knock is often one or more orders of magnitude greater in intensity than spark knock. A typical knock control strategy is spark retardation. This control strategy, however, is not effective against LSPI knock and is actually detrimental in mitigating LSPI knock. This is because during LSPI knock, combustion has already been initiated prior to the spark discharge, and thus retardation of the spark timing provides the cylinder charge even more time for auto-ignition to occur. Accordingly, while such knock detection and control systems work for their intended purpose, there remains a need for improvement in the relevant art.

SUMMARY

According to one example aspect of the invention, a control system for an engine of a vehicle is presented. In one exemplary implementation, the control system comprises: a knock sensor configured to generate a knock signal indicative of a vibration of the engine caused by abnormal combustion and a controller configured to: receive the knock signal, analyze the knock signal to detect low speed pre-ignition (LSPI) knock of the engine, in response to detecting the LSPI knock, enrich a fuel/air ratio of the engine and limit a torque output of the engine to a level that is less than a maximum torque output of the engine, and when enriching the fuel/air ratio of the engine and limiting the torque output of the engine does not mitigate the LSPI knock, output at least one message for a driver of the vehicle instructing the driver to take remedial action to mitigate the LSPI knock.

In some implementations, the message (i) instructs the driver of the vehicle to supply at least one of a specific quality of oil and a specific quality of fuel to the vehicle or (ii) instructs the driver of the vehicle to take the vehicle to a service center for service.

In some implementations, in response to detecting the LSPI knock, the controller is configured to enrich the fuel/air ratio of the engine and limit the torque output of the engine to a first torque limit for a calibratable number of engine power pulse (EPP) events. In some implementations, when enriching the fuel/air ratio of the engine and limiting the torque output of the engine to the first torque limit for the first period does not mitigate the LSPI knock, the controller is configured to limit the torque output of the engine to a second torque limit for a remainder of a key cycle of the engine. In some implementations, when limiting the torque output of the engine to the second torque limit for the second period does not mitigate the LSPI knock, the controller is configured to limit the torque output of the engine to a third torque limit until a calibratable amount of fuel has been used by the engine.

In some implementations, the controller is configured to output a first message while limiting the torque output of the engine to the third torque limit until the calibratable amount of fuel has been used by the engine, wherein the first message instructs the driver of the vehicle to provide at least one of a specific quality of oil and a specific quality of fuel to the vehicle. In some implementations, when the torque output of the engine is limited to the third torque limit until the calibratable amount of fuel has been used by the engine occurs a calibratable number of times, the controller is configured to output a second message instructing the driver of the vehicle take the vehicle to a service center for service.

In some implementations, the controller is configured to output the at least one message to a display of the vehicle for display to the driver of the vehicle. In some implementations, the engine is a turbocharged, direct injection (DI) engine.

According to another example aspect of the invention, an LSPI knock detection, mitigation, and driver notification method for a vehicle is presented. In one exemplary implementation, the method comprises: receiving, by a controller of the vehicle from a knock sensor of the vehicle, a knock signal indicative of a vibration of an engine of the vehicle caused by abnormal combustion, analyzing, by the controller, the knock signal to detect LSPI knock of the engine, in response to detecting the LSPI knock, enriching, by the controller, a fuel/air ratio of the engine and limiting, by the controller, a torque output of the engine to a level that is less than a maximum torque output of the engine, and when enriching the fuel/air ratio of the engine and limiting the torque output of the engine does not mitigate the LSPI knock, outputting, by the controller, at least one message for a driver of the vehicle instructing the driver to take remedial action to mitigate the LSPI knock.

In some implementations, the message (i) instructs the driver of the vehicle to supply at least one of a specific quality of oil and a specific quality of fuel to the vehicle or (ii) instructs the driver of the vehicle to take the vehicle to a service center for service.

In some implementations, in response to detecting the LSPI knock, the controller enriches the fuel/air ratio of the engine and limits the torque output of the engine to a first torque limit for a calibratable number of EPP events. In some implementations, when enriching the fuel/air ratio of the engine and limiting the torque output of the engine to the first torque limit for the first period does not mitigate the LSPI knock, the controller limits the torque output of the engine to a second torque limit for a remainder of a key cycle of the engine. In some implementations, when limiting the torque output of the engine to the second torque limit for the second period does not mitigate the LSPI knock, the controller limits the torque output of the engine to a third torque limit until a calibratable amount of fuel has been used by the engine.

In some implementations, the controller outputs a first message while limiting the torque output of the engine to the third torque limit until the calibratable amount of fuel has been used by the engine, wherein the first message instructs the driver of the vehicle to provide at least one of a specific quality of oil and a specific quality of fuel to the vehicle. In some implementations, when the torque output of the engine is limited to the third torque limit until the calibratable amount of fuel has been used by the engine occurs a calibratable number of times, the controller outputs a second message instructing the driver of the vehicle take the vehicle to a service center for service.

In some implementations, the controller outputs the at least one message to a display of the vehicle for display to the driver of the vehicle. In some implementations, the engine is a turbocharged DI engine.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIGS. 3A-3B are flow diagrams of an example LSPI knock detection, mitigation, and driver notification method according to the principles of the present disclosure.

DETAILED DESCRIPTION

As mentioned above, low speed pre-ignition (LSPI) knock cannot be mitigated via conventional spark retardation. Because its intensity is orders of magnitude higher than end-gas spark knock, LSPI knock could potentially damage the engine, thereby increasing vehicle warranty costs. In particular, LSPI knock often occurs in smaller displacement engines having high compression ratios, such as a turbocharged four-cylinder engine, particularly during high load operation. In addition, if the incorrect oil and/or fuel is provided to the engine, the probability of LSPI knock increases. Oil grade, for example, may vary from region to region. Thus, there remains a need for improved techniques for detecting and mitigating LSPI knock and, in the event that the vehicle cannot mitigate the LSPI knock, instructing the driver of the vehicle to provide the proper oil and/or fuel to the engine and, if all of the above fails to mitigate the LSPI knock, instructing the driver of the vehicle to take the vehicle to a service center for service.

Figure 1:
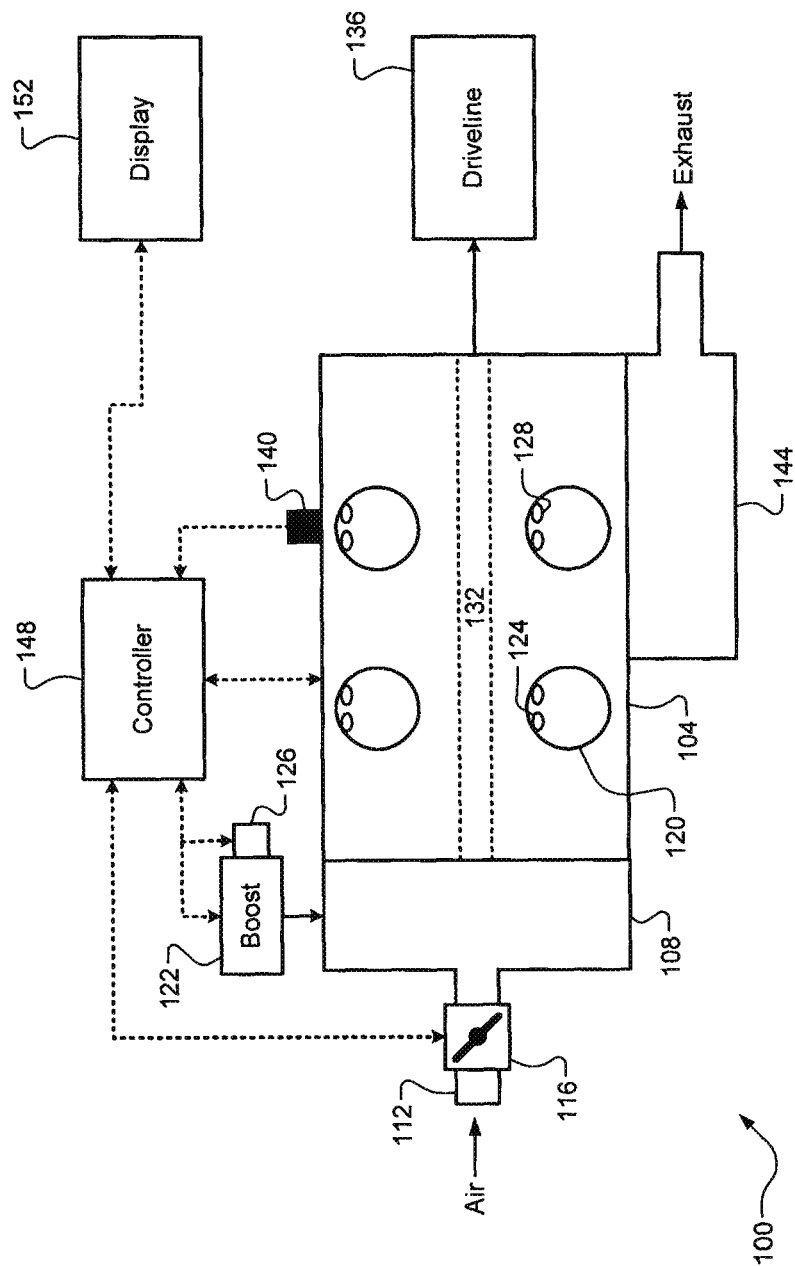
FIG. 1 is a diagram of an example engine according to the principles of the present disclosure.

Referring now to FIG. 1, a diagram of a vehicle 100 having an engine 104 is illustrated. The engine 104 is configured to combust a fuel/air mixture to generate drive torque. Non-limiting examples of the engine 104 include a spark ignition direct injection (SIDI) engine, but it will be appreciated that the techniques of the present disclosure could be applicable to any suitable engine comprising a knock sensor, such as a port fuel injection (PH) engine. In some implementations, the engine 104 could be a gasoline compression ignition engine (homogeneous charge compression ignition (HCCI), partially pre-mixed charge compression ignition (PPCI), pre-mixed charge compression ignition, etc.). The engine 104 draws air into an intake manifold 108 through an induction system 112 that is regulated by a throttle valve 116. The air in the intake manifold 108 is distributed to a plurality of cylinders 120 and therein combined with fuel injected by respective DI fuel injectors 124. While four cylinders are shown, it will be appreciated that the engine 100 could have any suitable number of cylinders. In some implementations, the engine 104 includes a boost system 122 (a turbocharger, a supercharger, etc.) having an associated wastegate or surge valve 126 for regulating boost pressure.

The fuel/air mixture in the cylinders 120 is compressed by pistons (not shown) and combusted by spark generated by respective spark plugs 128. For a smaller (e.g., 4 cylinder) configuration of the engine 104 with the boost system 122, a compression ratio of the cylinders 120 may be relatively high. The combustion of the fuel/air mixture within the cylinders 120 drives the pistons (not shown), which rotatably turn a crankshaft 132 to generate drive torque. The drive torque is then transferred, e.g., via a transmission (not shown), to a driveline 136. A knock sensor 140 is configured to generate a knock signal indicative of vibration of the engine 104 caused by abnormal combustion. In one exemplary implementation, the knock sensor 140 is an accelerometer-based sensor that is mounted to a block of the engine 104. The abnormal combustion, if unaccounted for, causes noticeable vibrations (noise, vibration, and/or harshness, or NVH) and/or could potentially damage the engine 104. While one knock sensor 140 is illustrated and discussed herein, it will be appreciated that the engine 104 could include a plurality of distinct knock sensors (one knock sensor per cylinder bank or group of cylinders, one knock sensor per cylinder, etc.).

Exhaust gas resulting from combustion is expelled from the cylinders 120 into an exhaust system 144 configured to treat the exhaust gas before releasing it into the atmosphere. For example, unburnt fuel from the abnormal combustion could cause increase emissions that must then be handled by the exhaust system 144, which could increase the cost or complexity of the exhaust system 144. A controller 148 controls operation of the engine system 100, such as controlling the throttle valve 116 (airflow), the DI fuel injectors 124 (fuel), and the spark plugs 128 (spark) and communicates with a display 152 (e.g., a driver interface). The controller 148 also receives the knock signal from the knock sensor 140. The controller 148 is configured to detect knock of the engine 104 by analyzing the knock signal. In one exemplary implementation, the controller 148 is configured to detect both (i) LSPI knock and (ii) spark knock using the knock signal, which will be described in greater detail below. While not shown, it will be appreciated that the controller 148 is configured to receive other inputs, such as a crank angle measurement (e.g., in crank angle degrees, or CAD) from a crankshaft position sensor (not shown).

Causes of LSPI knock events are numerous. Extended and reoccurring LSPI can lead to thermal runways and surface (cylinder wall) ignition. Possible causes of LSPI events include: (1) hot combustion chamber deposits that flake off and ignite the cylinder charge because the flaking deposit is exposed to long resonance times and elevated pressure, which causes it to ignite, (2) oil droplets from the piston crevice enter into the combustion chamber of the cylinder 120 and act as a localized octane reducer causing auto-ignition prior to the spark discharge, and (3) auto-ignition prior to the spark discharge due to the boundary conditions, such as in gasoline compression ignition engines. Some engines overcome these surface ignition problems with improved hardware, engine design, and calibration. LSPI events, however, are still problematic in boosted engines with very retarded combustion phasing and high compression ratios (long resonance times at elevated pressure), particularly when operating at low speed and high load.

In one exemplary implementation, the analyzing or processing of the knock signal is as follows. For a particular monitoring window, the knock signal is processed according to associated parameters (signal amplifications, detection thresholds, etc.). In one exemplary implementation, the knock signal is filtered, rectified, and its energy is integrated across the monitoring window to obtain a single value. The window could be calibrated throughout the engine speed range. Based on a fast Fourier transform (FFT), the "knocking frequency" is isolated, which allows monitoring of first and second order pressure oscillations occurring in a particular frequency range (e.g., 5-10 kilohertz (kHz)). As previously discussed herein, only one monitoring window is typically active at a time. Before a new window is active, there may be a reset period for the controller 148. Thus, by implementing two distinct monitoring windows separated by a controller reset window, a single controller 148 is capable of detecting both LSPI knock and spark knock using a single knock sensor 140.

Figure 2:
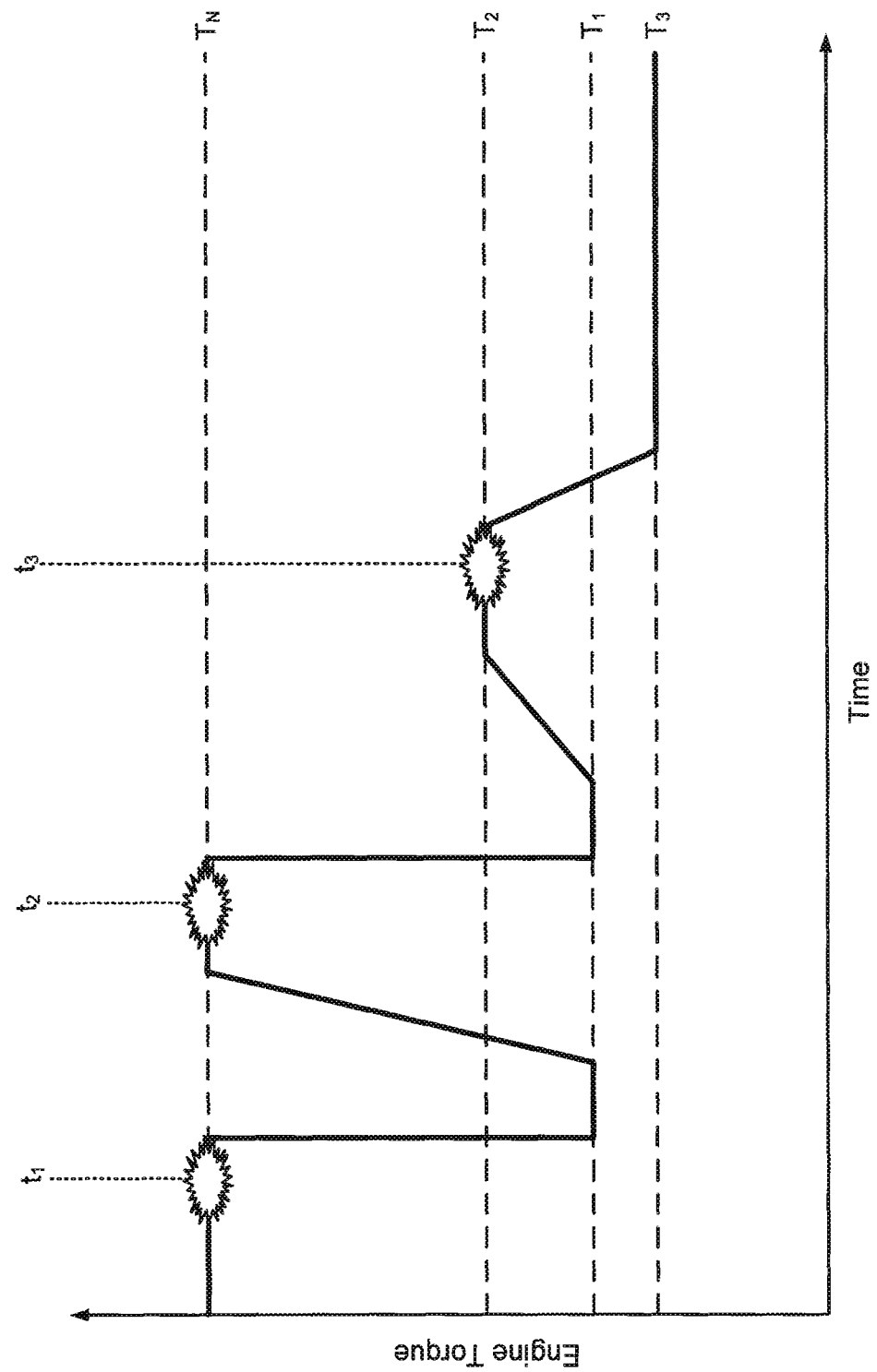
FIG. 2 is a plot of an example low speed pre-ignition (LSPI) knock detection and mitigation process according to the principles of the present disclosure.

Referring now to FIG. 2, a plot of an example LSPI knock detection and mitigation process is illustrated. During normal engine operation prior to time $t_1$, the engine 104 is not limited below its maximum output torque and is generating a nominal torque $T_N$. At time $t_1$, an LSPI knock event is detected. This represents the start of a first phase (Phase 1). It will be appreciated that the term "LSPI knock event" could comprise a plurality of detected occurrences of LSPI knock (e.g., a series of consecutive LSPI knocks). In response to detecting the LSPI knock event, the controller 148 limits the torque output of the engine 104 to a first torque limit $T_1$ that is less than the nominal torque $T_N$. This reduction in torque output of the engine 104 could be achieved, for example, by controlling the throttle valve 116 and/or by controlling the wastegate or surge valve 126 associated with the boost system 122. This torque reduction is also referred to herein as a "torque derate." For the initial detected LSPI knock event, the controller 148 also enriches the fuel/air ratio of the engine 104 (e.g., increases the amount of fuel injected by the DI fuel injectors 128). As shown, this torque drop to the first torque limit $T_1$ occurs very fast as the process is attempting to quickly mitigate the LSPI knock. The torque output of the engine 104 is held at the first torque limit for a calibratable period, such as a calibratable number of engine power pulse (EPP) events (e.g., 30 EPP events).

After this calibratable period, the controller 148 removes the limiting and increases engine torque output back to the nominal torque $T_N$. This represents the end of Phase 1. As shown, however, another LSPI knock event is subsequently detected at time $t_2$. Thus, the fuel enrichment and temporary torque limiting did not mitigate (or fully mitigate) the LSPI knock. This represents the start of a second phase (Phase 2). The controller 148 again limits the torque output of the engine 104 for the calibratable period (e.g., repeat a portion of Phase 1). After this calibratable period, however, the controller 148 limits the torque output of the engine to a second torque limit $T_2$. As shown, this second torque limit $T_2$ is greater than the first torque limit $T_1$ but still less than the nominal torque $T_N$. It will be appreciated, however, that the second torque limit $T_2$ could be the same as the first torque limit $T_1$. This second torque limit $T_2$ is maintained by the controller 148 for the remainder of a current key cycle of the engine 104 (e.g., until the engine is turned off), after which Phase 2 ends. When a calibratable number of entries into Phase 2 have occurred, a first message could be output for the driver. Various exit conditions also exist to effectively reset this Phase 2 counter. These are discussed in greater detail below with reference to FIGS. 3A-3B.

As shown, before Phase 2 ends, yet another LSPI knock event is detected at time $t_3$ before the end of the current key cycle of the engine 104. This represents the start of a third phase (Phase 3). The controller 148 limits the torque output of the engine 104 to a third torque limit $T_3$ until a calibratable amount of fuel has been consumed by the engine 104. This calibratable amount of fuel could be one entire fuel tank of the vehicle 100, but it will be appreciated that other suitable amounts could be used. It will also be appreciated that fuel consumption monitoring could continue across one or more partial fuel refill events (e.g., Phase 3 would not end upon any single fuel refill event). While the third torque limit $T_3$ is shown as being less than the first and second torque limits $T_1$ and $T_2$ it will be appreciated that two or all of these torque limits $T_1$, $T_2$, and $T_3$ could have the same magnitudes. After the calibratable amount of fuel has been consumed by the engine 104, Phase 3 ends. When a calibratable number of entries into Phase 3 have occurred, a second message could be output to the driver. Various exit conditions also exist to effectively reset this Phase 3 counter. These are discussed in greater now with reference to FIGS. 3A-3B.

Figure 3A:
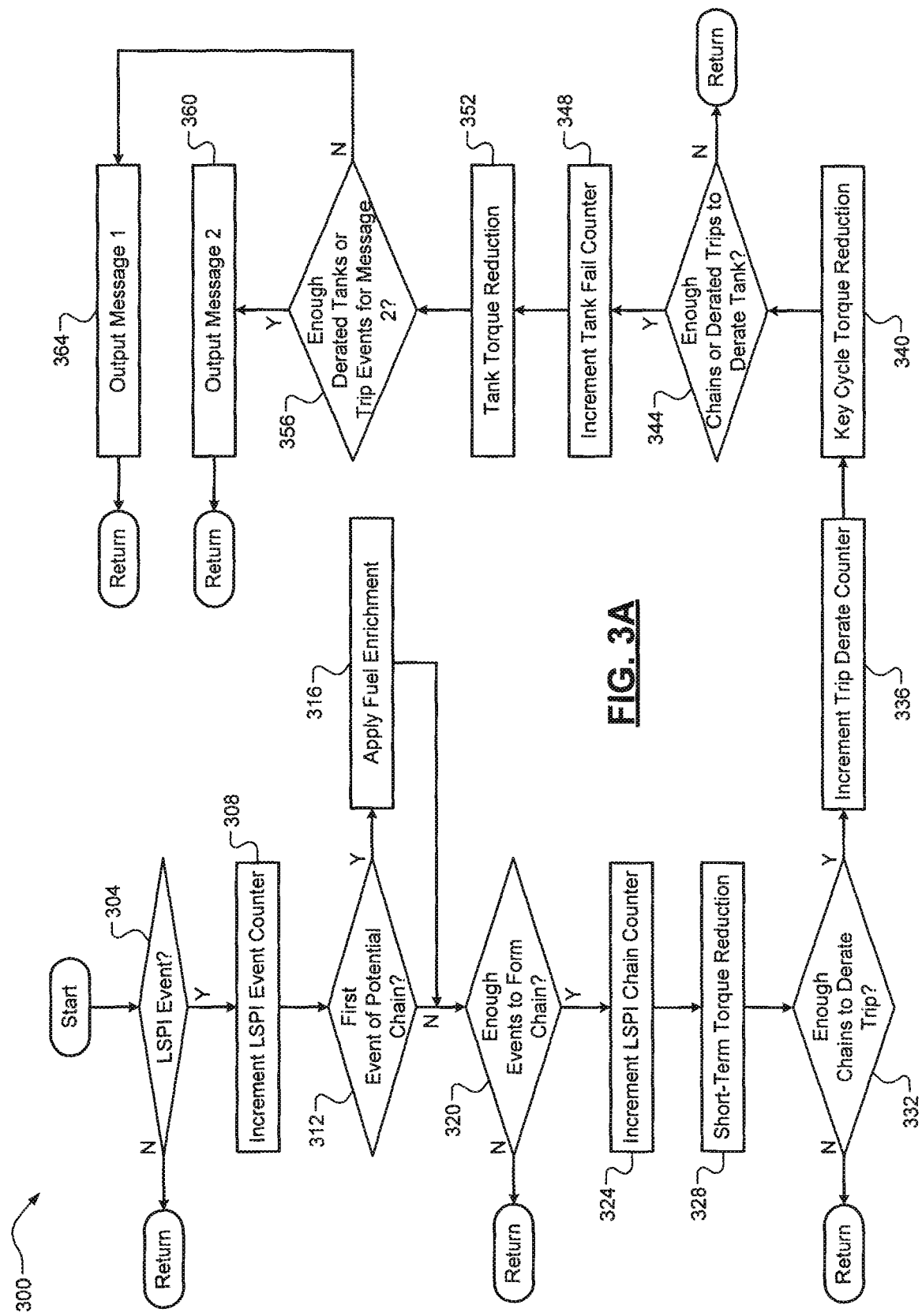

Referring now to FIGS. 3A-3B, flow diagrams of example LSPI knock detection, mitigation, and driver notification methods 300, 380 are illustrated. Referring first to FIG. 3A, an example method 300 of knock detection, mitigation, and driver notification is illustrated. At 304, the controller 148 detects whether an LSPI event has occurred. When true, the method 300 proceeds to 304. Otherwise, the method 300 ends or returns to 304. At 308, the controller 148 increments an LSPI event counter. At 312, the controller 148 determines whether the LSPI event detected at 304 is the first LSPI event of a potential chain of events (e.g., whether the LSPI event counter is equal to one). When true, the method 300 proceeds to 316 where fuel enrichment (enrichment of the FA ratio of the engine 104) is performed by the controller 148. Otherwise, the method 300 proceeds directly to 320. At 320, the controller 148 determines whether there are enough LSPI events to form a chain (e.g., whether the LSPI event counter exceeds a calibratable event threshold).

When true, the method 300 proceeds to 324. Otherwise, the method 300 ends or returns to 304. At 324, the controller 148 increments an LSPI chain counter. At 328, the controller 148 performs short-term torque reduction. This could include, for example, limiting torque to the first torque limit $T_1$ for a calibratable number of EPP events (see FIG. 2). At 332, the controller 148 determines whether there are enough chains to derate torque for the remainder of the current trip or key-cycle (e.g., whether the LSPI chain counter exceeds a calibratable chain threshold). When true, the method 300 proceeds to 336. Otherwise, the method 300 ends or returns to 304. At 336, the controller 148 increments a trip derate counter. At 340, the controller 148 performs key cycle torque reduction. This could include, for example, limiting torque to the second torque limit $T_2$ for the remainder of the current key-cycle (see FIG. 2). At 344, the controller 148 determines whether there are enough chains or derated trips to derate torque for the remainder of the fuel tank or some other calibratable amount of fuel (e.g., whether the respective counters exceed respective calibratable tank thresholds).

When true, the method 300 proceeds to 348. Otherwise, the method 300 ends or returns to 304.

At 348, the controller 148 increments a tank fail counter. At 352, the controller 148 performs tank torque reduction. This could include, for example, limiting torque to the third torque limit $T_3$ until the calibratable amount of fuel has been consumed by the engine 104 (see FIG. 2). At 356, the controller 148 determines whether there are enough derated tanks or trip events to output the second message instructing the driver to take the vehicle to a service station for service (e.g., whether the respective counters exceed calibratable service thresholds). When true, the method 300 proceeds to 360 where the controller 148 outputs the second message (e.g., to display 152) and the method 300 then ends or returns to 304. Otherwise, the method 300 proceeds to 364 where the controller outputs the first message (e.g., to display 152) instructing the driver to provide a specific type or quality of oil and or fuel to the vehicle 100 and the method 300 then ends or returns to 304.

Referring now to FIG. 3B, an example method 380 of controlling the various counters described above is illustrated. At 382, the controller 148 determines whether a refuel event has occurred. This could be determined, for example, using a fuel level sensor in a fuel tank of the vehicle 100. When true, the method 380 proceeds to 384. Otherwise, the method 380 ends or returns to 382. At 384, the controller 148 determines whether a tank derate is currently active. When true, the method 380 proceeds to 386 where the controller 148 clears or discontinues the tank derate and the method 380 then ends or returns to 382. Otherwise, the method 380 proceeds to 388. At 388, the controller 148 determines whether the tank fail counter is greater than zero. When true, the method 380 proceeds to 390. Otherwise, the method 380 ends or returns to 382. At 390, the controller 148 increments a clear tank counter. At 392, the controller 148 determines whether enough clear tanks (tank refill events) have occurred to decrement the tank fail counter (e.g., whether the number of clear tanks exceeds a calibratable threshold). When true, the method 380 proceeds to 394. Otherwise, the method 380 ends or returns to 382. At 394, the controller 148 decrements the tank fail counter. At 396, the controller 148 sets the clear tank counter to zero and the method 380 then ends or returns to 382. In other words, a certain number of clear tanks (fuel refill events) without entering the tank derate can result in the tank fail counter being decremented.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A low speed pre-ignition (LSPI) knock control system for an engine of a vehicle, the control system comprising:
   a knock sensor configured to generate a knock signal indicative of a vibration of the engine caused by abnormal combustion; and
   a controller configured to:
   receive the knock signal;
   analyze the knock signal to detect low speed pre-ignition (LSPI) knock of the engine;
   in response to detecting the LSPI knock, enrich a fuel/air ratio of the engine and limit a torque output of the engine to a first torque limit that is less than a maximum torque output of the engine for a first period that defines a calibratable number of engine power pulse (EPP) events;
   when enriching the fuel/air ratio of the engine and limiting the torque output of the engine to the first torque limit for the first period does not mitigate the LSPI knock, limit the torque output of the engine to a second torque limit for a second period defining a remainder of a key cycle of the engine;
   when limiting the torque output of the engine to the second torque limit for the second period does not mitigate the LSPI knock, limit the torque output of the engine to a third torque limit until a calibratable amount of fuel has been used by the engine; and
   when enriching the fuel/air ratio of the engine and limiting the torque output of the engine does not mitigate the LSPI knock, output at least one message for a driver of the vehicle instructing the driver to take remedial action to mitigate the LSPI knock.

2. The control system of claim 1, wherein the message (i) instructs the driver of the vehicle to supply at least one of a specific quality of oil and a specific quality of fuel to the vehicle or (ii) instructs the driver of the vehicle to take the vehicle to a service center for service.

3. The control system of claim 1, wherein the controller is configured to output a first message while limiting the torque output of the engine to the third torque limit until the calibratable amount of fuel has been used by the engine, wherein the first message instructs the driver of the vehicle to provide at least one of a specific quality of oil and a specific quality of fuel to the vehicle.

4. The control system of claim 3, wherein when the torque output of the engine is limited to the third torque limit until the calibratable amount of fuel has been used by the engine occurs a calibratable number of times, the controller is configured to output a second message instructing the driver of the vehicle take the vehicle to a service center for service.

5. The control system of claim 1, wherein the controller is configured to output the at least one message to a display of the vehicle for display to the driver of the vehicle.

6. The control system of claim 1, wherein the engine is a turbocharged, direct injection (DI) engine.

7. A low speed pre-ignition (LSPI) knock detection, mitigation, and driver notification method for a vehicle, the method comprising:
   receiving, by a controller of the vehicle from a knock sensor of the vehicle, a knock signal indicative of a vibration of an engine of the vehicle caused by abnormal combustion;
   analyzing, by the controller, the knock signal to detect LSPI knock of the engine;
   in response to detecting the LSPI knock, enriching, by the controller, a fuel/air ratio of the engine and limiting, by the controller, a torque output of the engine to a first torque limit that is less than a maximum torque output of the engine for a first period defining a calibratable number of engine power pulse (EPP) events;

when enriching the fuel/air ratio of the engine and limiting the torque output of the engine to the first torque limit for the first period does not mitigate the LSPI knock, limiting, by the controller, the torque output of the engine to a second torque limit for a second period defining a remainder of a key cycle of the engine;

when limiting the torque output of the engine to the second torque limit for the second period does not mitigate the LSPI knock, limiting, by the controller, the torque output of the engine to a third torque limit until a calibratable amount of fuel has been used by the engine; and when enriching the fuel/air ratio of the engine and limiting the torque output of the engine does not mitigate the LSPI knock, outputting, by the controller, at least one message for a driver of the vehicle instructing the driver to take remedial action to mitigate the LSPI knock.

8. The method of claim 7, wherein the message (i) instructs the driver of the vehicle to supply at least one of a specific quality of oil and a specific quality of fuel to the vehicle or (ii) instructs the driver of the vehicle to take the vehicle to a service center for service.

9. The method of claim 7, wherein the controller outputs a first message while limiting the torque output of the engine to the third torque limit until the calibratable amount of fuel has been used by the engine, wherein the first message instructs the driver of the vehicle to provide at least one of a specific quality of oil and a specific quality of fuel to the vehicle.

10. The method of claim 9, wherein when the torque output of the engine is limited to the third torque limit until the calibratable amount of fuel has been used by the engine occurs a calibratable number of times, the controller outputs a second message instructing the driver of the vehicle take the vehicle to a service center for service.

11. The method of claim 7, wherein the controller outputs the at least one message to a display of the vehicle for display to the driver of the vehicle.

12. The method of claim 7, wherein the engine is a turbocharged, direct injection (DI) engine.

* * * * *